(12) United States Patent
Summers

(10) Patent No.: US 7,264,292 B1
(45) Date of Patent: Sep. 4, 2007

(54) CARGO BED EXTENDER

(76) Inventor: Jerald E. Summers, 1214 Grassy Hollow Way, Paso Robles, CA (US) 93446

( * ) Notice: Subject to any disclaimer, the term of this patent is extended or adjusted under 35 U.S.C. 154(b) by 0 days.

(21) Appl. No.: 11/313,295

(22) Filed: Dec. 19, 2005

Related U.S. Application Data

(60) Continuation-in-part of application No. 11/121,399, filed on May 3, 2005, now abandoned, which is a division of application No. 10/746,839, filed on Dec. 24, 2003, now Pat. No. 6,908,134.

(60) Provisional application No. 60/320,058, filed on Mar. 26, 2003.

(51) Int. Cl.
    B60P 3/34 (2006.01)
(52) U.S. Cl. .............. 296/26.11; 296/57.1; 296/26.09
(58) Field of Classification Search .......... 296/26.11, 296/57.1, 26.08, 26.09, 26.1, 26.01
    See application file for complete search history.

(56) References Cited

U.S. PATENT DOCUMENTS

| | | | |
|---|---|---|---|
| 2,872,239 A | 2/1959 | Bowness et al. | |
| 4,472,639 A | 9/1984 | Bianchi | |
| 4,531,773 A * | 7/1985 | Smith ...................... | 296/26.11 |
| 5,468,038 A | 11/1995 | Sauri | |
| 5,478,130 A * | 12/1995 | Matulin et al. ............ | 296/57.1 |
| 5,700,047 A | 12/1997 | Leitner et al. | |
| 5,741,039 A | 4/1998 | Habdas | |
| 5,752,636 A | 5/1998 | Manley | |
| 5,752,800 A | 5/1998 | Brincks et al. | |
| 5,765,892 A | 6/1998 | Covington | |
| 5,775,759 A | 7/1998 | Cummins | |
| 5,788,311 A * | 8/1998 | Tibbals ...................... | 296/26.11 |
| 5,806,907 A | 9/1998 | Martinus et al. | |
| 5,816,638 A | 10/1998 | Pool, III | |
| 5,820,188 A | 10/1998 | Nash | |
| 5,820,189 A | 10/1998 | Tew | |
| 5,826,932 A | 10/1998 | DeSimone | |
| 5,829,945 A * | 11/1998 | Stanley ...................... | 296/26.09 |
| 5,857,724 A | 1/1999 | Jarman | |
| 5,902,000 A | 5/1999 | Wold | |
| 5,902,001 A * | 5/1999 | Schneider ................ | 296/26.13 |
| 5,911,464 A | 6/1999 | White | |
| 5,918,925 A | 7/1999 | Perrin | |
| 5,924,753 A | 7/1999 | DiBassie | |
| 5,934,726 A | 8/1999 | Bossett | |
| 5,934,727 A | 8/1999 | Store et al. | |
| 5,941,588 A | 8/1999 | Marconi | |
| 5,954,383 A * | 9/1999 | Beck et al. ................ | 296/57.1 |
| 5,971,459 A | 10/1999 | Gauthier | |

(Continued)

OTHER PUBLICATIONS

U.S. Appl. No. 11/121,399, filed May 3, 2005, Summers.

Primary Examiner—Kiran B. Patel
(74) Attorney, Agent, or Firm—Thomas F. Lebens; Sinsheimer Juhnke Lebens & McIvor, LLP

(57) ABSTRACT

A cargo bed extender in accordance with one embodiment comprises a housing; a first roller channel formed within the housing; a second roller channel formed within the housing; a first roller positioned within the first roller channel; a second roller positioned within the second roller channel; an end panel coupled to the first roller and the second roller; a first side panel hingedly coupled to the end panel; and a second side panel hingedly coupled to the end panel.

8 Claims, 18 Drawing Sheets

U.S. PATENT DOCUMENTS

| | | | |
|---|---|---|---|
| 5,975,608 A | 11/1999 | Jarman | |
| 5,992,920 A | 11/1999 | Bailey et al. | |
| 6,007,127 A | 12/1999 | Garofalo | |
| 6,019,410 A * | 2/2000 | Trostle et al. | 296/26.11 |
| 6,082,801 A | 7/2000 | Owen et al. | |
| 6,113,173 A | 9/2000 | Leitner et al. | |
| 6,120,076 A | 9/2000 | Adsit et al. | |
| 6,131,980 A | 10/2000 | Sankrithi | |
| 6,279,980 B1 * | 8/2001 | Straschewski | 296/26.11 |
| 6,340,190 B1 | 1/2002 | Rosebrugh et al. | |
| 6,364,392 B1 * | 4/2002 | Meinke | 296/26.1 |
| 6,398,283 B1 * | 6/2002 | Knudtson et al. | 296/26.09 |
| 6,454,338 B1 | 9/2002 | Glickman et al. | |
| 6,550,841 B1 | 4/2003 | Burdon et al. | |
| 6,626,478 B1 | 9/2003 | Minton | |
| 6,631,938 B1 * | 10/2003 | Burns | 296/64 |
| D485,800 S | 1/2004 | Smith | |
| 6,676,182 B2 | 1/2004 | Fitts | |
| 6,860,536 B1 * | 3/2005 | Schimunek | 296/26.09 |
| 6,908,134 B1 * | 6/2005 | Summers | 296/57.1 |
| 6,988,756 B1 * | 1/2006 | Meinke et al. | 296/26.08 |
| 7,090,276 B1 * | 8/2006 | Bruford et al. | 296/26.1 |
| 2002/0006317 A1 | 1/2002 | Hoffmann et al. | |
| 2002/0109368 A1 * | 8/2002 | Mink et al. | 296/26.13 |
| 2006/0222471 A1 * | 10/2006 | Lussier | 410/130 |

\* cited by examiner

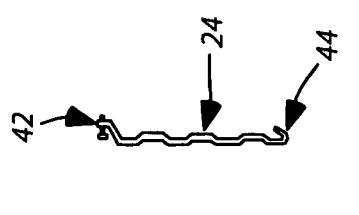
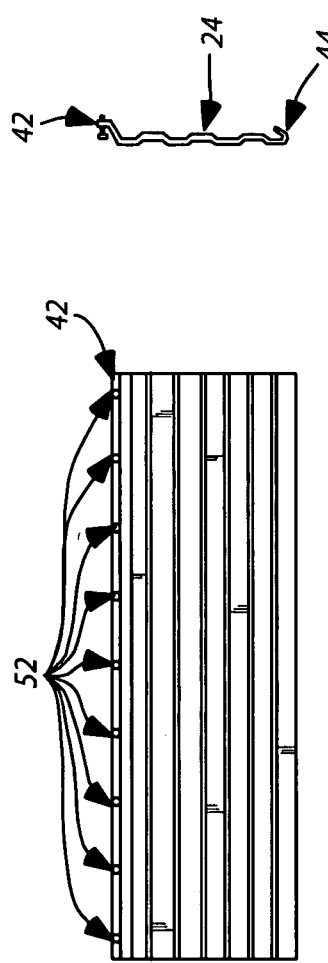
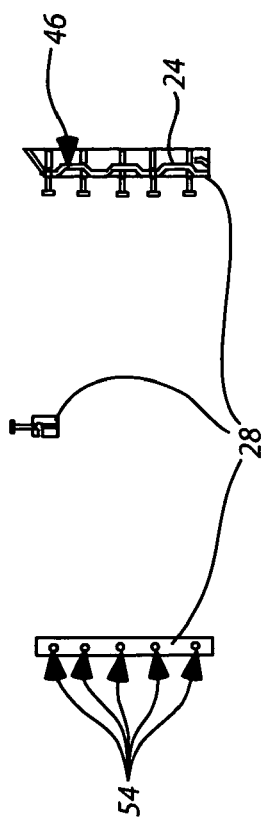

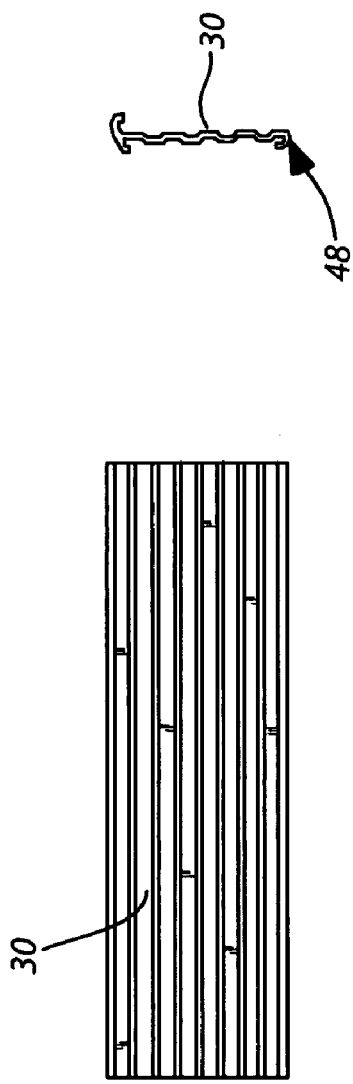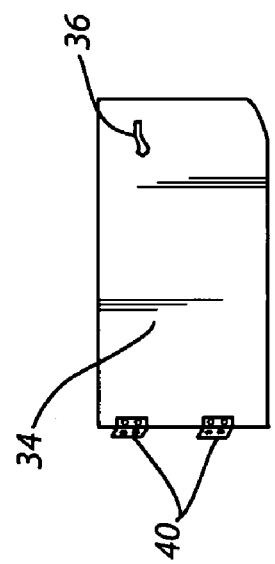

CARGO BED EXTENDER

REFERENCE TO EARLIER APPLICATIONS

This application is a continuation-in-part of U.S. patent application Ser. No. 11/121,399, filed May 3, 2005 now abandoned, entitled CARGO BED EXTENDER which is a divisional U.S. patent application Ser. No. 10/746,839, filed Dec. 24, 2003 now U.S. Pat. No. 6,908,134, entitled CARGO BED EXTENDER, which application claims priority to U.S. Provisional Patent Application No. 60/320,058 filed Mar. 26, 2003, all of which applications are incorporated herein by reference in their entirety.

BACKGROUND OF THE INVENTION

The filed of the invention relates to automobile cargo beds and more particularly to cargo bed extension devices.

One of the major features of a pickup truck is its cargo bed, allowing for the transportation of loads of cargo (tools, recreational equipment, building materials, etc.). At the rear of a pickup truck's cargo bed, is a tailgate. A tailgate is a hinged door that opens to a horizontal position to facilitate loading and unloading of cargo into the cargo bed and closes to a vertical position to secure items in the cargo bed. In many cases the cargo's size exceeds that available in the cargo bed when the tailgate is closed in the vertical position. Consequently, in this case, the tailgate must be left in the open horizontal position to facilitate transporting the oversized cargo load. This leaves the unsecured oversized cargo load susceptible to falling out, unless a rope or other fastening device is used to secure the oversized cargo load.

There is thus a need in the art for a simple to use cargo bed extender device that is easy to install, economical, durable, is capable of compact stowage, and does not interfere with the normal operation of the pickup truck cargo bed and tailgate.

SUMMARY OF THE INVENTION

The present invention advantageously addresses the needs above as well as other needs by providing a cargo bed extender device that is easy to install, economical, durable, is capable of compact stowage, and does not interfere with the normal operation of the pickup truck cargo bed and tailgate.

One embodiment can be characterized as a method comprising stowing a first side panel, a second side panel and an end panel in a housing, wherein the housing at least partially encloses the first side panel, the second side panel and the end panel when in a stowed position; sliding the first side panel, the second side panel and the end panel from the housing; and deploying the first side panel, the second side panel and the end panel to form at least part of an extended cargo bed.

Another embodiment can be characterized as a cargo bed extender comprising a housing; a first roller channel formed within the housing; a second roller channel formed within the housing; a first roller positioned within the first roller channel; a second roller positioned within the second roller channel; an end panel coupled to the first roller and the second roller; a first side panel hingedly coupled to the end panel; and a second side panel hingedly coupled to the end panel.

Yet another embodiment includes a cargo bed extender comprising an end panel; a first side panel hingedly coupled to a first side of the end panel; and a second side panel hingedly coupled to a second side of the end panel, wherein the end panel, the first side panel and the second side panel are slid into a housing when moved from a deployed position to a stowed position.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 2 is a top and end perspective of an outer shell of the embodiment of FIG. 1;

FIG. 3 is a top, end, and side view of an end cap of the embodiment of FIG. 1;

FIG. 4 is a top and end perspective of an end panel of the embodiment of FIG. 1;

FIG. 5 is a side view of a side panel of the embodiment of FIG. 1;

Figure 1:
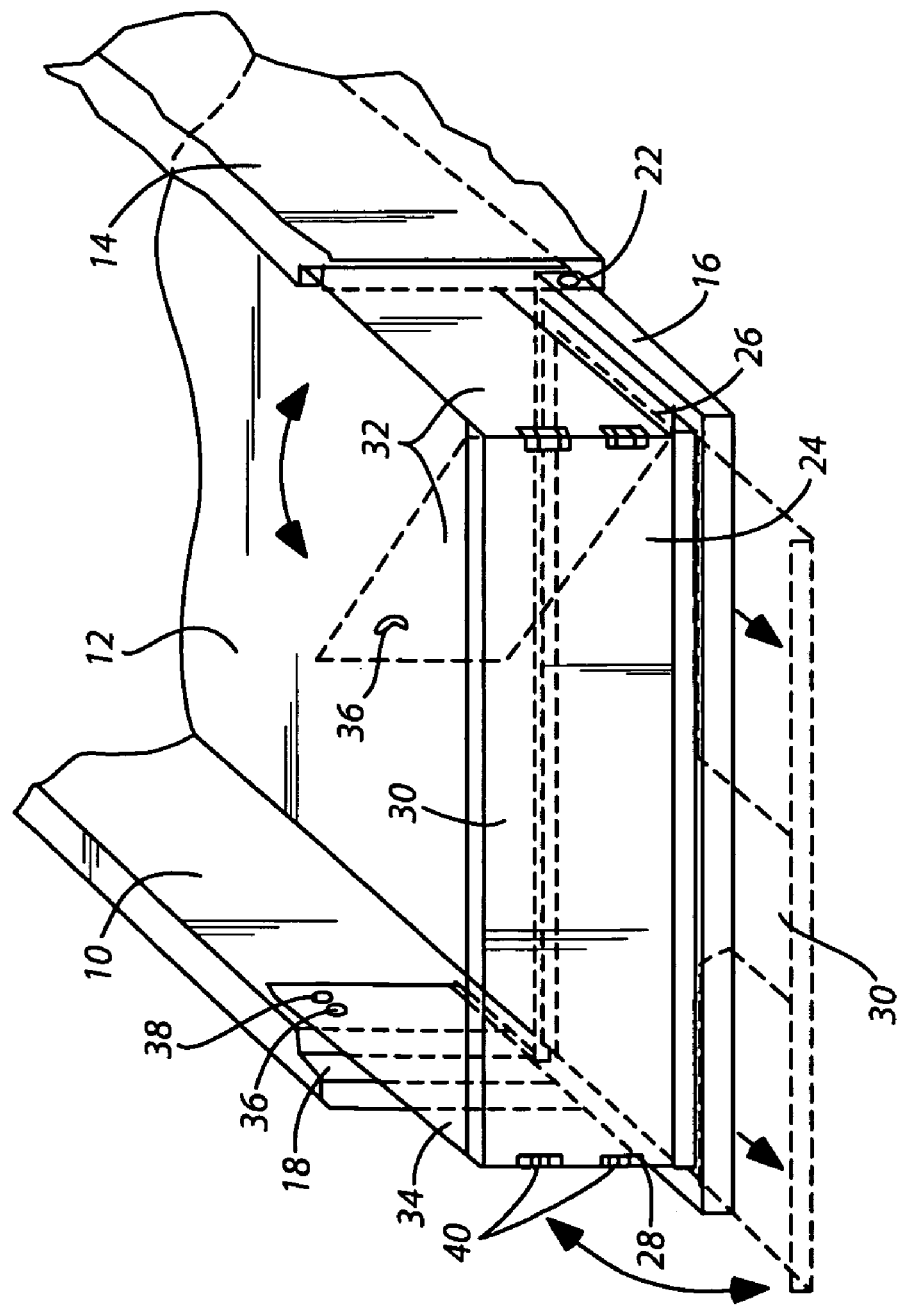
FIG. 1 is a partial rear perspective view of a pickup truck cargo bed with an embodiment of the present invention mounted on a tailgate of the cargo bed.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Referring to FIG. 1, shown is a partial rear perspective view of a pickup truck (or other vehicle) cargo bed with an embodiment of the present invention mounted on a tailgate of the cargo bed.

Depicted are a pickup truck bed floor 12, a left pickup truck bed sidewall 10, a right pickup truck bed sidewall 14, a retainer 38, an oblong slot 36, a tailgate' 16, a tailgate jam 18, a tailgate hinge 22, an outer shell 24, end caps 26, 28, a left side panel 34, a right side panel 32, side panel hinges 40, and an end panel 30.

The right and left pickup truck bed sidewalls 10, 14 extend vertically from sides of the pickup truck bed floor 12.

The tailgate 16 has hinges 22 attached at the lower rear of the inner sides of pickup truck bed sidewalls 10, 14, allowing the tailgate 16 to swivel up and down (to vertical and horizontal positions, respectively) to facilitate opening and closing of the tailgate 16.

In accordance with the present embodiment, the outer shell 24 is attached to an inner side of the tailgate 16. The outer shell end caps 26, 28 slide over the ends of the outer shell 24 adding support and strength to the outer shell 24. Retainers 38 are fastened to the upper rear of the inner side of the pickup truck bed sidewalls 10, 14.

The side panels 32, 34 are pivotally attached to the end panel 30 by the end panel hinges 40.

The end panel 30, with the attached side panels 32, 34, pivotally attached thereto and in a positional substantially parallel thereto, is positioned and slidable behind the outer shell.

In a "lowered position," the end panel is concealed fully behind the outer shell, with the exception of lip at an outer edge of the end panel, which engages a distal edge of the tailgate. In this lowered position, the tailgate is operable into its raised and lowered positions, and the end panel is substantially concealed from view behind the outer shell, except for the lip that engages the distal edge of the tailgate.

In a "raised position," the end panel is slid from behind the outer shell, with a channel formed adjacent to the outer shall at an inner edge of the end panel engaging a channel formed adjacent to the end panel at the distal edge of the tailgate. With the end panel in the raised position, the channels cooperate and function as a hinge so as to allow rotation of the end panel from a position parallel to the outer shell, across the plane of the outer shell, to a position substantially normal to the outer shell. In this rotated position, the side panels are deployed toward the left and right pickup bed sidewalls to positions substantially normal to the end panel, and, simultaneously, substantially normal to the outer shell, thereby forming two end walls of a box, the rear of which is the end panel, and the bottom of which is the outer shell. The side panels are secured to the left and right pickup bed sidewalls, such as with a fastener, so as to prevent rotation of the sidewalls relative to Referring next to FIG. 2, shown is a top and end perspective view of an outer shell of the embodiment of FIG. 1.

Illustrated are an outer shell 24, having one edge formed as a hinge catch 44 (or channel 44), and an opposite edge expressed as a beveled flange 42 (or lip), the beveled flange 42 containing mounting screw holes 52 therein. The hinge catch 44 facilitates opening and closing of the end panel 30 (FIG. 1) when the end panel 30 is deployed. The outer shell mounting screw holes 52 (and corresponding mounting screws) secure the outer shell 24 to the tailgate 16 (FIG. 1) of the pickup truck.

Referring next to FIG. 3, shown is a top, end, and side view of an end cap of the embodiment of FIG. 1.

Depicted is the end cap 28, containing retaining slots 46 and mounting screw holes 54. The end cap 28 slides over the ends of the outer shell 24, adding support and strength to the outer shell 24. The end cap mounting screw holes 54, allow the end cap 28 to be secured to the inner wall of the tailgate 16 (FIG. 1) of the pickup truck.

Referring next to FIG. 4, shown is a top and end perspective view of an end panel of the embodiment of FIG. 1 This figure illustrates the end panel 30, having one edge formulated as a hinge catch 48 (or channel 48). The hinge catch 48 acts as a stop and hinge in conjunction with the outer shell hinge catch 44 (FIG. 2).

Referring next to FIG. 5, shown is a side view of a side panel of the embodiment of FIG. 1. Shown is the side panel 34, containing an oblong slot and side panel hinges 40. The oblong slot 36, which is curved and has a circular cutout at one end, allows the side panel 34 to be fastened by means of a retainer 38 (FIG. 1.) to the left pickup truck sidewall 10 (FIG. 1). (A similar structure allows the side panel to the fastened by means of a retainer (FIG. 1) to the right pickup truck sidewall (FIG. 1). The side panel hinges 40 provide means for attaching the side panel 34 to the end of the end panel 30 (FIG. 1), as well as enabling side panel 34 to be folded inward for stowage and outward for deployment.

Figure 6:
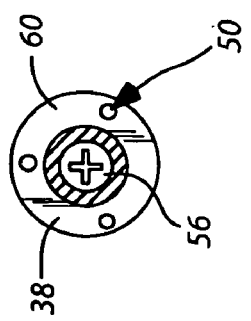
FIG. 6 is a top and side view of a retainer of the embodiment of FIG. 1.
Figure 6A:
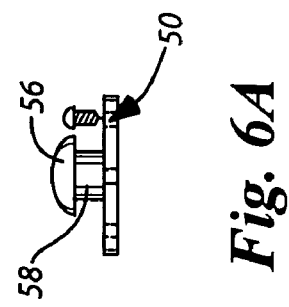

Referring next to FIG. 6, shown is a top and side view of a retainer 38 of the embodiment of FIG. 1.

A retainer 38 is shown comprised of a retainer base 60 with mounting screw holes 50, retainer head 56, and retainer neck 58.

Figure 7:
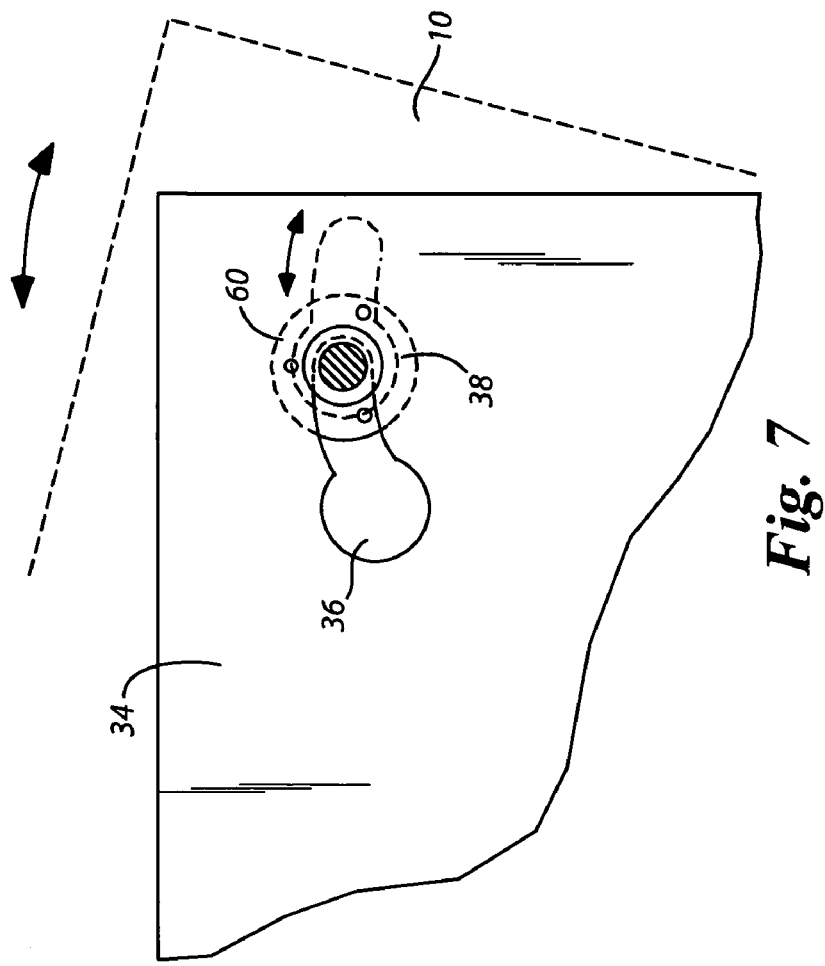
FIG. 7 is a perspective of the retainer of FIG. 6 functioning with the side panel of FIG. 5 and an oblong slot of the embodiment of FIG. 1.

Referring next to FIG. 7, shown is a perspective of the retainer 38 of FIG. 6 functioning with the side panel 34 of FIG. 5 and an oblong slot of the embodiment of FIG. 1.

Shown is retainer 38 (with mounting screw holes 50 in the base 60 of the retainer) in relation to side panel 34 and sidewall of a pickup truck bed 10. The retainer 38 is attached to the upper-rear of the inner side of the pickup truck bed sidewall 10. The large end of oblong slots 36 (keyhole slots) in the side panel 34 is larger than retainer head 56. The oblong slot 36 in the side panel 34 engages the retainers 38 when the rear edge of the tailgate 16 (FIG. 1) is slighted lifted in the vertical direction, enabling large end of the oblong slots 36 to align with and fit over the retainer head 56. Then, lowering the tailgate 16 back to the horizontal position slides the retainer 38 to the narrow end of the oblong slot 36 (where the oblong slots are smaller than the retainer head 56), securing the side panel 34 against the sidewall 10 of the pickup trick bed.

Figure 8:
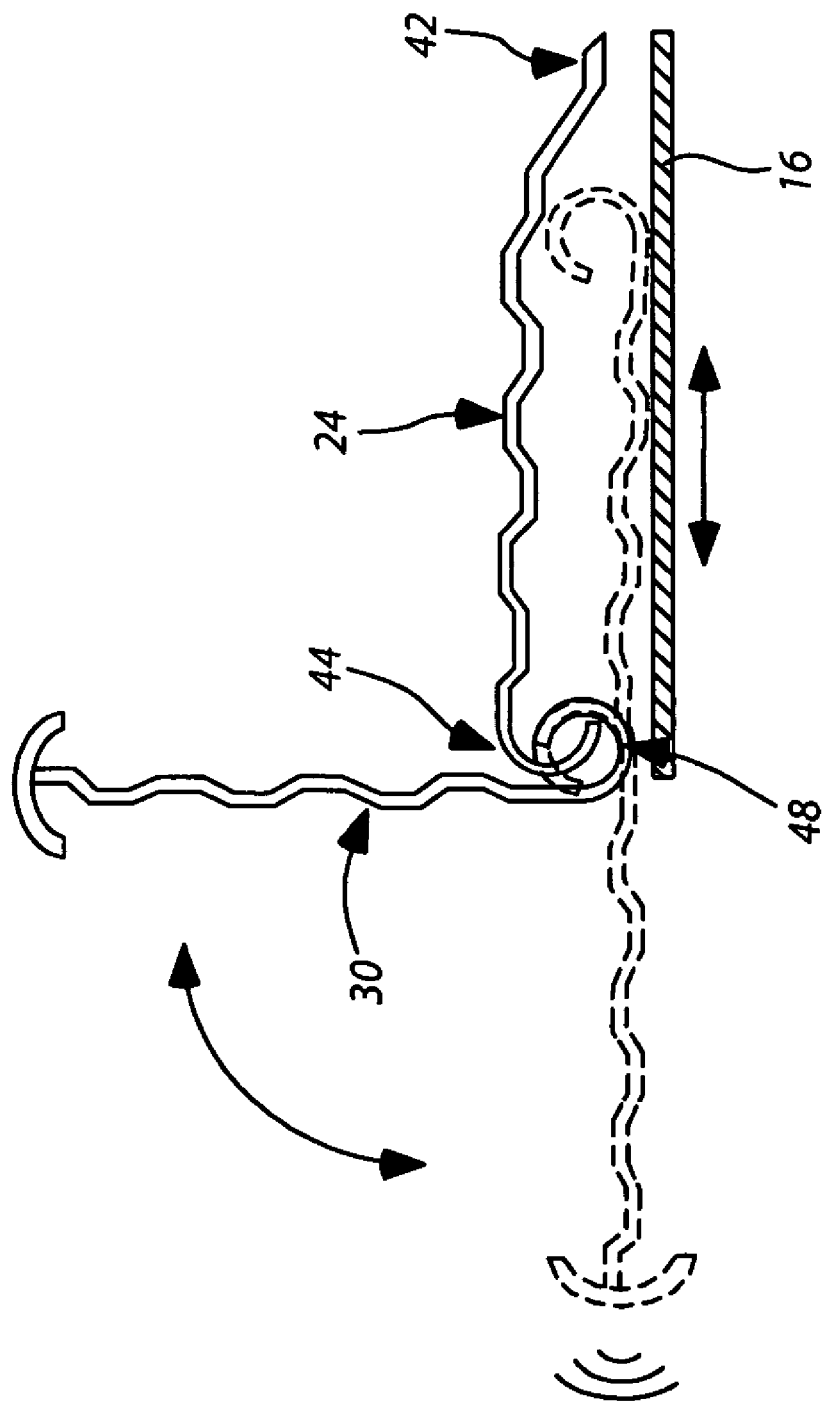
FIG. 8 is a side cross sectional view of the outer shell of FIG. 2 functioning with the end panel of FIG. 4.

Referring next to FIG. 8, shown is a side cross-sectional view of the outer shell 24 of FIG. 2 functioning with the end panel 30 of FIG. 4.

This side view displays the end panel 30, the end panel hinge catch 48, the outer shell 24, the outer shell hinge catch 44, the beveled flange edge 42 of the outer shell, and the tailgate 16.

The end panel 30 slides between the outer shell 24 and the pickup truck tailgate 16 for compact stowage.

When tailgate 16 is open in a horizontal position, the end panel 30 is deployed by sliding it out horizontally from under the outer shell 24 until end panel hinge catch 48 locks in place against the outer shell hinge catch 44 forming a hinge. The present embodiment is then deployed by rotating the end panel 30 into a vertical position, folding out the side panels 32, 34 (FIG. 1) by rotating the side panels away from the end panel on their hinges and securing the side panels against the inner side of the pickup truck sidewalls 10 14 (FIG. 1) by means of oblong slots in the side panels and respective retainers 38 (FIG. 1) in the pickup trick side panels.

Figure 9:
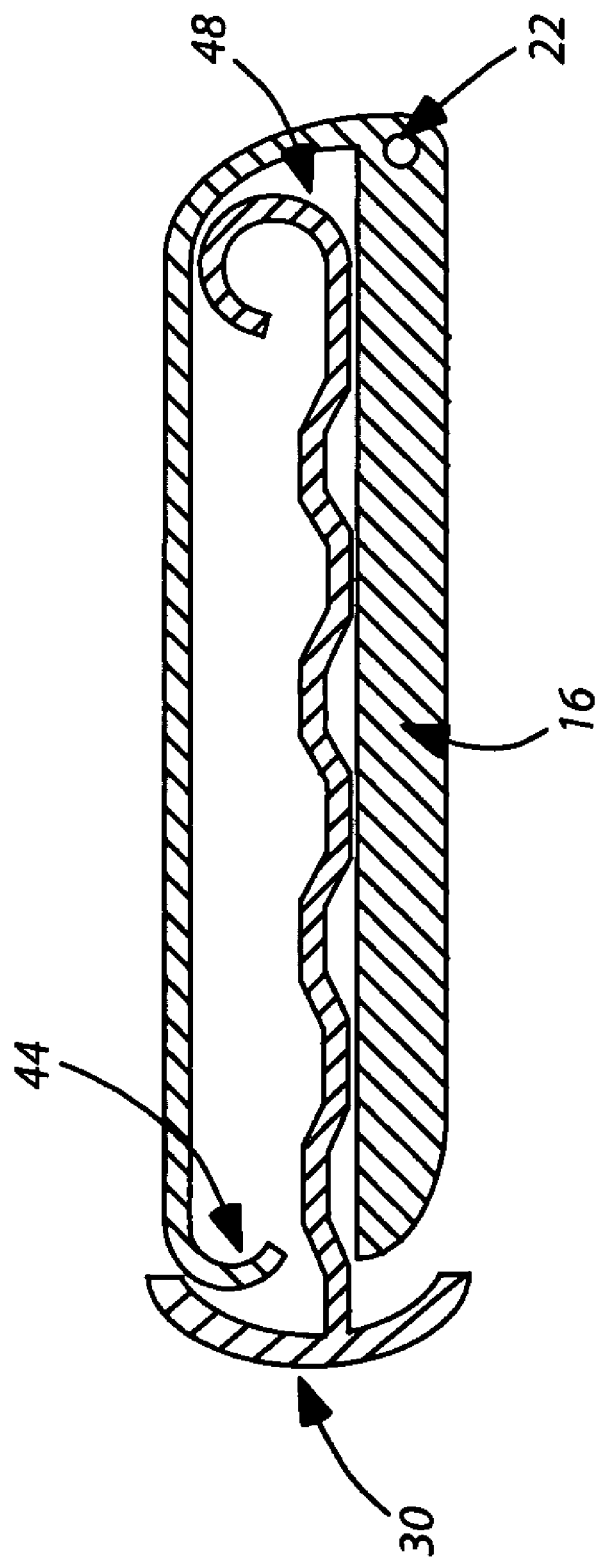
FIG. 9 is a side cross-sectional view of an alternative embodiment of the present invention.

Referring next to FIG. 9, shown is a side cross-sectional view of an alternative embodiment of the present invention.

This view shows a cargo bed tailgate panel 16, tailgate hinges 22, end panel 30 and end panel hinge catches 44, 48. In accordance with the present embodiment, the cargo bed tailgate panel 16 has a slot at a top edge of the tailgate panel 16, wherein an inner edge of the slot is formed as a first hinge catch 48. The cargo bed tailgate panel is used in the present embodiment in lieu of the outer shell of the previous embodiment. As a result, an aesthetically pleasing "OEM" look is achieved, with the present embodiment being virtually undetectable when not deployed.

The end panel 30 has an edge formed as a second hinge catch 44 wherein the second hinge catch engages the first hinge catch when the end panel 30 is in a deployed position. A left and right side panel (not shown) are each hinged on respective edges of the end panel as shown in FIG. 1 and described above in previous embodiments. The left and right side panels fold in on their respective hinges such that they are substantially parallel to the end panel when in a stowed position (as described above). Thus, when the cargo bed extender is stowed it is conveniently and discretely located within the cargo bed tailgate panel 16 giving the pickup truck a clean, unmodified look Therefore, it will be appreciated that the present invention, in some embodiments, provides a useful and simple to use cargo bed compact extender device that is easy to install, economical, and durable. It will be further appreciated that when not solving the problem created by oversized cargo loads, the present embodiment is capable of compact stowage, and does not interfere with the normal operation of the pickup truck cargo bed and tailgate.

Figure 10:
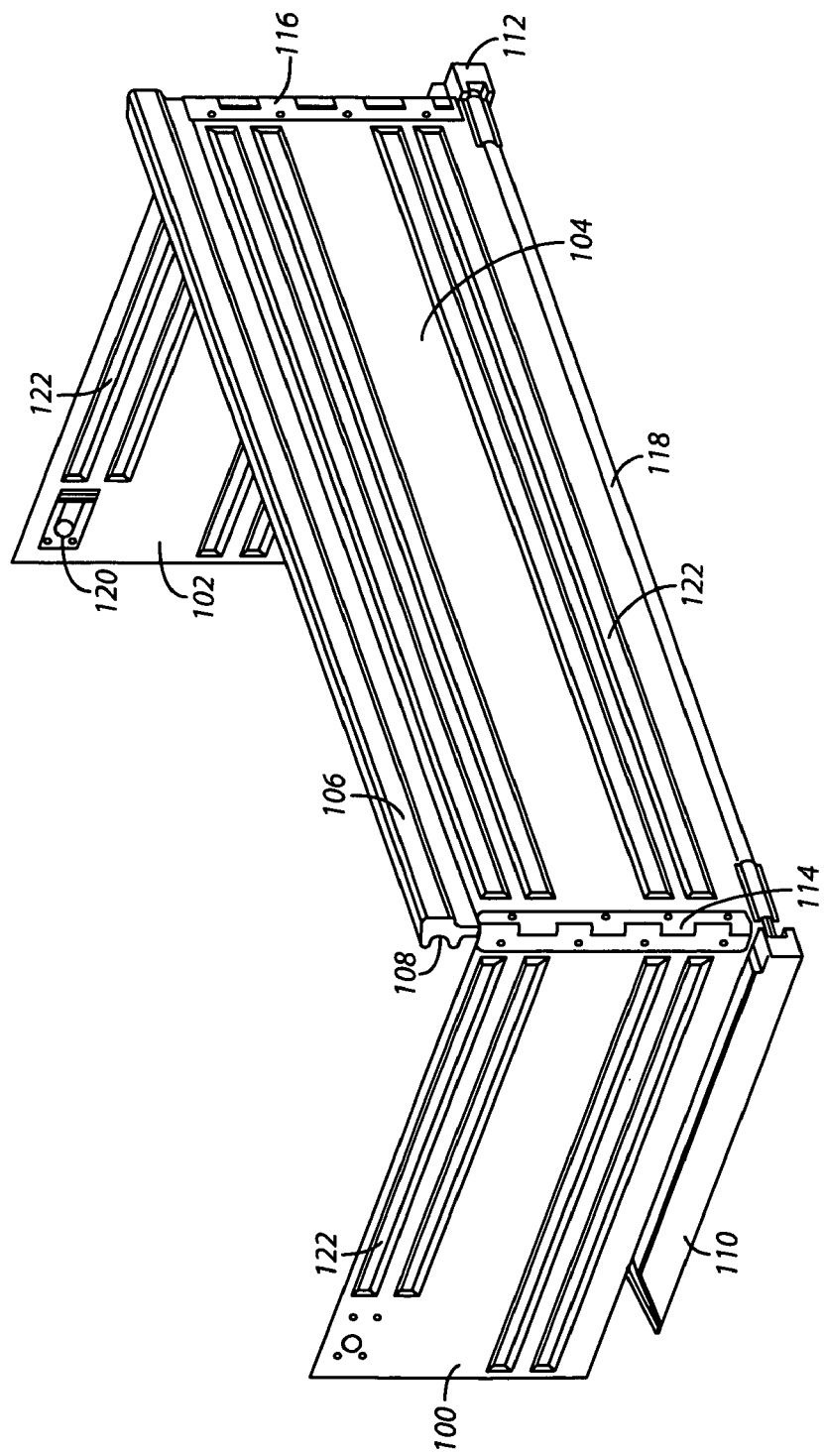
FIG. 10 is a rear perspective view illustrating a deployed cargo bed extender in accordance with an alternative embodiment.

Referring to FIG. 10, a rear perspective view is shown of deployed cargo bed extender in accordance with an alternative embodiment. Shown is a first side panel 100, a second side panel 102, an end panel 104, a support bar 106, a curved portion of the support bar 108, a first end block 110, a second end block 112, a first hinge 114, a second hinge 116, an axel 118, and a retainer clip 120. While not shown in FIG. 10, the cargo bed extender is generally attached to a tailgate of a truck when in use.

The first side panel 100 is attached to the end panel 104 through the first hinge 114. The second side panel 102 is attached to the end panel 104 through the second hinge 116. The end panel 104 is coupled to the first end block 110 and the second end block 112 through the axel 118 and rollers (shown in FIG. 13). The axel 118 is attached to a set of rollers that slide in roller channels (shown in FIG. 14) of the first end block 110 and the second end block 112. The support bar 106 is attached to a top side of the end panel 104.

The second side panel 102 includes the retainer clip 120. The first side panel 100 also includes a retainer clip (not shown in the present view). The retainer clip 120 is used to fasten the second side panel 102 to a retainer post installed on, for example, an inner side of a bed of the truck. Similarly, the retainer clip of the first side panel 100 is used to fasten the first side panel 100 to a separate retainer post located on, for example, the inner side of the bed of the truck. In an alternative embodiment, for example in an original equipment manufacture (OEM) model, the retainer clips are attached to, for example, a striker post of the truck. Many different options can be used to fasten the first side panel 100 and the second side panel 102 in place once in the deployed position. Advantageously, the retainer clip 120 is located near a top of the side panel in order to provide for additional rigidity of the side panels of the cargo bed extender.

In one embodiment, the retainer clip 120 is a spring loaded. In operation, a portion of the retainer clip is moved, for example, toward the back of the cargo bed. The center portion is spring loaded, such that when released, it will snap back into place. After moving the center portion of the retainer clip toward the back of the cargo bed, the clip is positioned over the retainer post (not shown). The center portion is then released and snaps back and engages the retainer post. The force from the spring holds the retainer clip on the retainer post. Advantageously, the spring loaded retainer clip prevents the side panels from coming loose when the truck hits a bump in the road or during the normal vibrations that occur when driving. As mentioned above, other means for attaching the side panels to the cargo bed are utilized in other embodiments. One example, of a retainer clip and retainer post is shown and described below with reference to FIGS. 18-20.

In one embodiment, the end panel 104, the first side panel 100 and the second side panel 102 are constructed from polypropylene that includes inlayed fibers (e.g., nylon fibers) for structural reinforcement. The end panel 104, the first side panel 100 and the second side panel 102 are vacuum molded and subjected to a ultra-violet hardening treatment. Other materials such as plastic, metal, compositions, or alloys can alternatively be utilized. Other materials are also used in alternative embodiments. Optionally, the end panel 104, the first side panel 100 and the second side panel 102 are formed with corrugations 122 in order to further strengthen the panels. The support bar 106 is made from, for example, plastic, such as Polyvinyl Chloride (PVC) or metal. Other materials are also used in alternative embodiments. Advantageously, in some embodiments, the end panel 104, the first side panel 100 and the second side panel 102 are constructed as a solid panel which prevents even small objects from falling out of the truck be and also keeps objects in the back of the truck be concealed from, for example, most other people inside of cars or trucks.

The first hinge 114 and the second hinge 116 are attached to the first side panel 100 and the second side panel 102, respectively, through rivet attachments. The first hinge 114 and the second hinge 116 are also attached to the end panel 104 through rivet attachments. Other types of attachment means are used in alternative embodiments.

Figure 11:
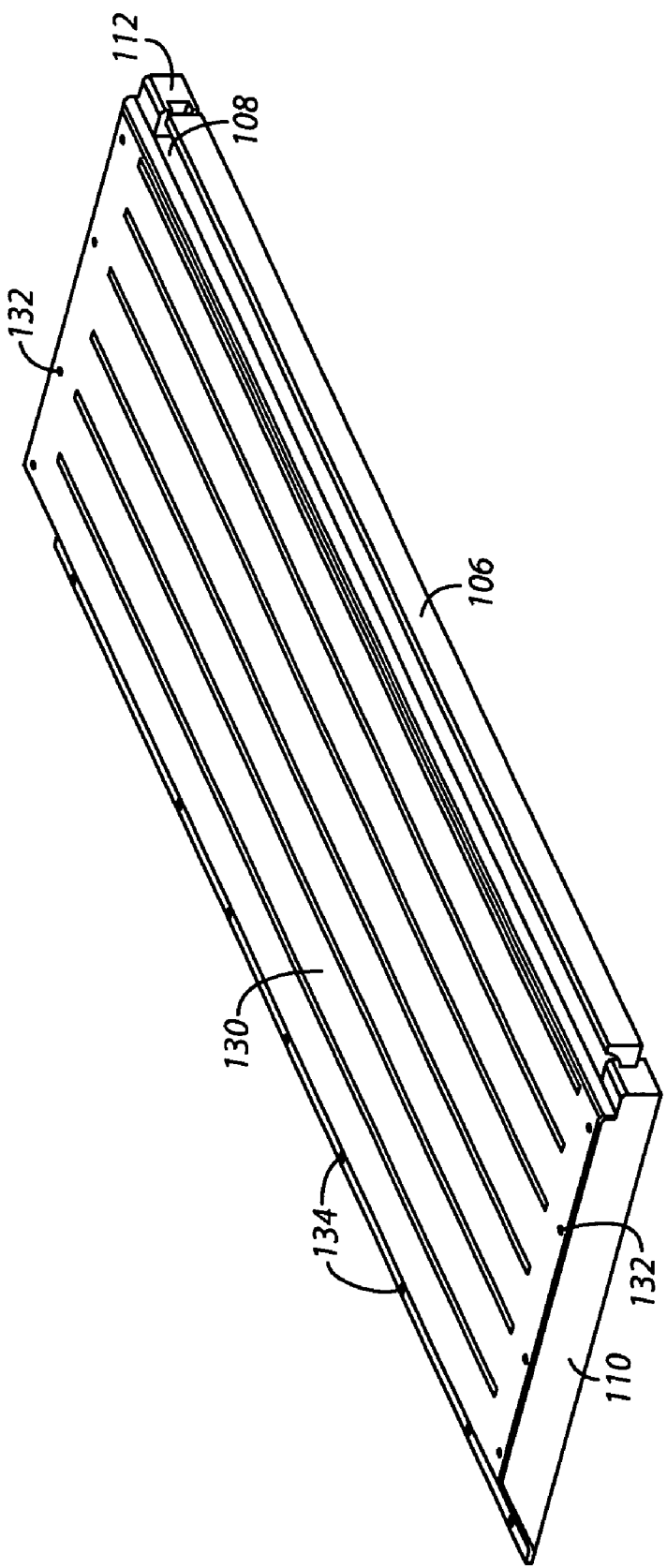
FIG. 11 is a rear perspective view illustrating the cargo bed extender of FIG. 10 in a stowed position.

Referring next to FIG. 11, a rear perspective view is shown of the cargo bed extender of FIG. 10 in a stowed position. Shown is the support bar 106, the curved portion of the support bar 108, the first end block 110, the second end block 112, a housing panel 130, a plurality of end block fasteners 132 and a plurality of mounting fasteners 134. When in a stowed position, the end panel 104, the first side panel 100 and the second side panel 102 are stowed beneath the housing panel 130.

The housing panel 130 is attached to the first end block 110 and the second end block 112 with the plurality of end block fasteners 132. The plurality of end block fasteners 132 are, for example, screws. Other types of fasteners are used in alternative embodiments. The plurality of end block fasteners 132 additionally extend through the bottom of the first end block 110 and the second end block 112 into a tailgate of a truck (not shown) in order to secure the cargo bed extender to the tailgate of the truck. The plurality of mounting fasteners 134 (e.g., screws or other fasteners) are also used to attach the cargo bed extender to the tailgate of the truck.

When in the stowed position, the curved portion 108 of the support bar 106 does not fully retract under the housing panel 130. Thus, the curved portion 108 of the support bar 106 is accessible when the cargo bed extender is stowed. The curved portion 108 of the support bar 106 provides a convenient place for a user to hold in order to extract the cargo bed extender from the stowed position. This allows the end panel 104, the first side panel 100 and the second side panel 102 to be easily deployed from the stowed position. The support bar 106 also provides additional support and strength to the end panel 104. The support bar 106 is attached to end panel 104 in a tongue and groove manner, where the end panel 104 is the tongue and the support bar 106 had a groove portion formed at a bottom of the support bar 106. Rivets or other fasteners are then used to fasten the support bar 106 to the end panel 104.

The first end block 110 and the second end block 112 provide support for the housing panel 130. As described below with reference to FIGS. 15-17 the first end block 110 and the second end block 112 each include a roller channel for sliding the end panel 104, the first side panel 100 and the second side panel 102 from the stowed position shown in FIG. 11 to the deployed position shown in FIG. 10.

Figure 13:
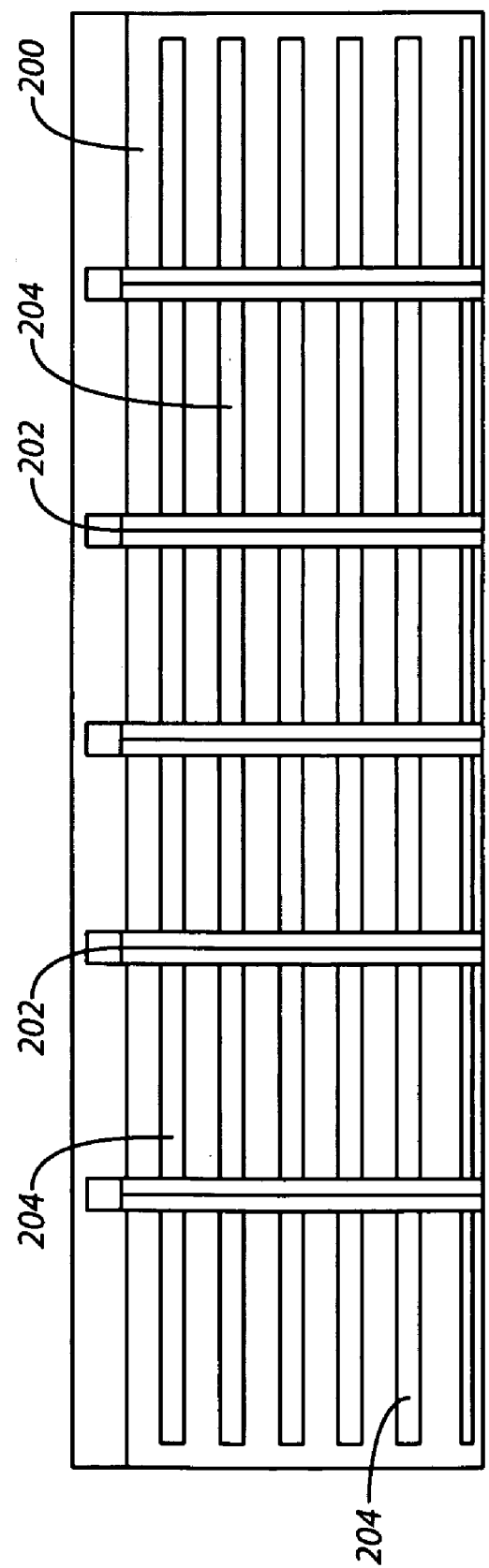
FIG. 13 is a top view illustrating a housing panel shown in FIG. 12 in accordance with an alternative embodiment.

The housing panel 130 is made from the same material as the end panel 104 and the side panels in accordance with one embodiment. As shown, the housing panel 108 is a solid panel. Optionally, as shown in FIG. 13, the housing panel 108 includes holes or slots. Advantageously, the housing panel 108 allows a user to lower the tailgate and load items in the back of the truck including on top of the housing panel 108. After the items are loaded on top of the housing panel 108, the end panel 104, the first side panel 100 and the second side panel 102 can then be deployed. In some embodiments, the housing panel 108 is removed and the end panel, the first side panel and the second side panel are exposed when in the stowed position. In yet other embodiments, the end panel 104, the first side panel 100 and the second side panel 102 are stowed and deployed from the tailgate of the truck. Thus, the tailgate of the truck provides a storage space for the end panel 104, the first side panel 100 and the second side panel 102. Still alternatively, the housing panel 108 can be replaced by a frame or a partial covering for the end panel 104, the first side panel 100 and the second side panel 102.

Figure 12:
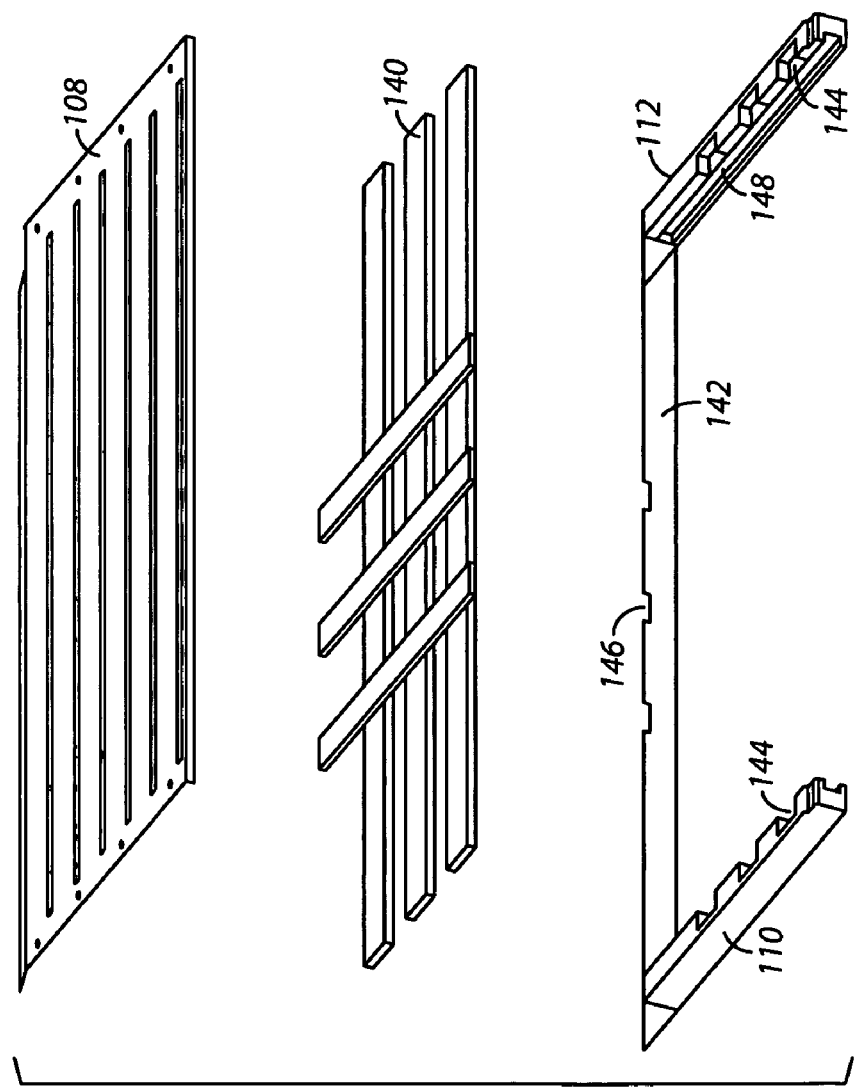
FIG. 12 is an exploded rear perspective view illustrating a housing assembly of the cargo bed extender shown in FIG. 10 in accordance with one embodiment.

Referring to FIG. 12, an exploded rear perspective view is shown of a housing assembly of the cargo bed extender shown in FIG. 10 in accordance with one embodiment. Shown is the first end block 110, the second end block 112, the housing panel 108, an inner frame 140, a front block 142, notches 144 in the first end block and the second end block, notches 146 in the front block and a roller channel 148.

When the cargo bed is assembled, the inner frame 140 is fits into the notches 144 in the first end block 110 and the second end block 112 and into the notches 146 in the front block 142. Optionally, screws are used to attach the inner frame 140 to the front block 140, the first end block 110 and the second end block 112. The housing panel 108 is then attached to the first end block 110 and the second end block 112 with screws as described above.

The inner frame 140 provides support for the housing panel 108. This allows heavy items to be placed on top of the housing panel 108 when the cargo bed extender is in either the stowed or deployed position. The inner frame 140 is made from, for example, aluminum (e.g., T-6 aircraft grade aluminum). The inner frame 140 is additionally made from other materials in alternative embodiments, such as other metals, alloys, or composite materials.

Referring to FIG. 13, a top view is shown of a housing panel shown in FIG. 12 in accordance with an alternative embodiment. Shown is the housing panel 200, a plurality of support straps 202 and a plurality of slots 204.

The housing panel 200 shown includes the plurality of slots 204. Additionally, aligned perpendicular to the slots 204 are the plurality of support straps 202. The plurality of support straps 202 help reinforce the housing panel 200 so that is can support a large amount of weight. The housing panel 200, in one embodiment, is used with the housing assembly shown in FIG. 12.

Figure 14:
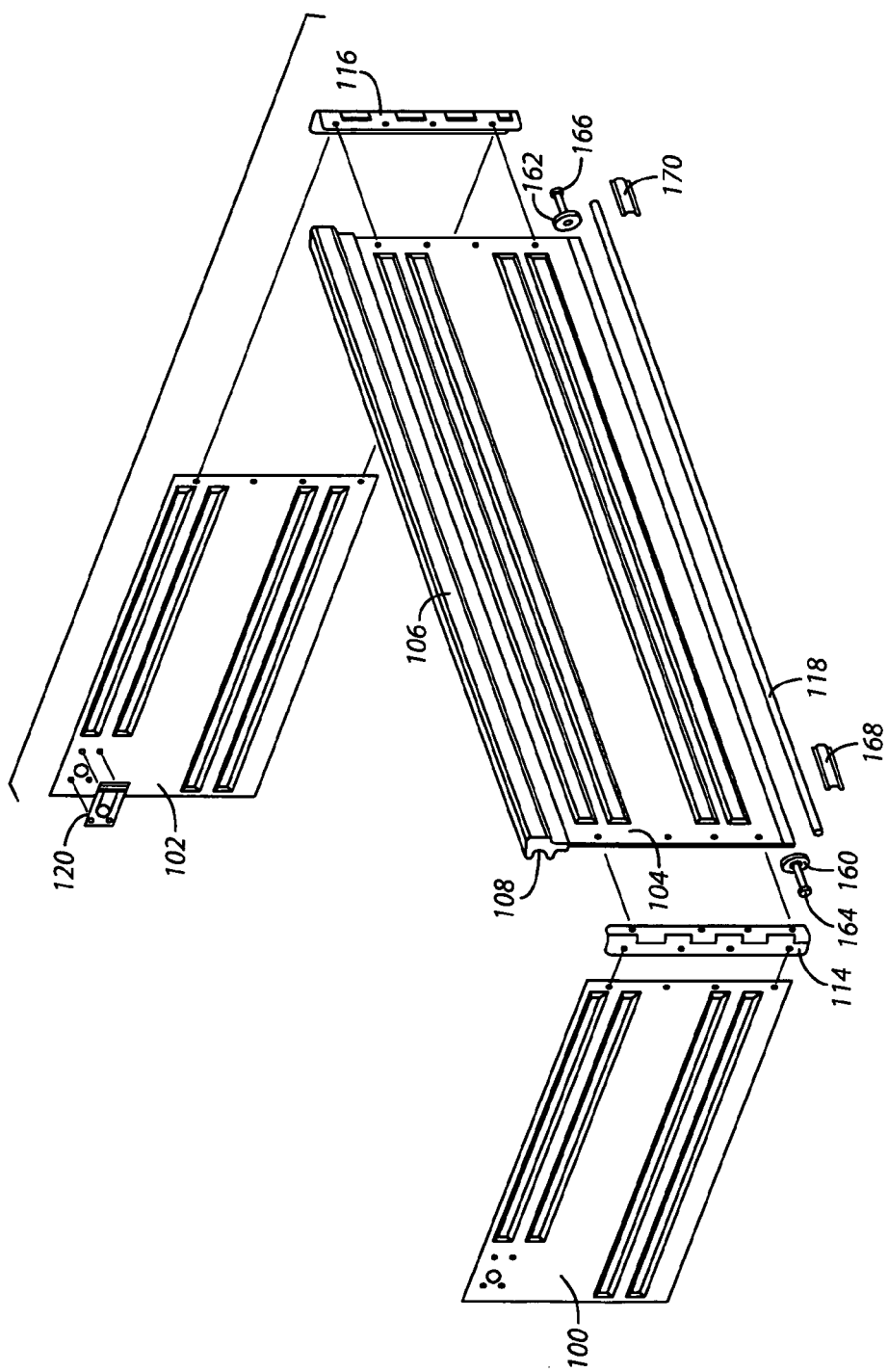
FIG. 14 is an exploded elevated rear perspective view illustrating an end and side panel assembly of the cargo bed extender shown in FIG. 10 in accordance with one embodiment.

Referring to FIG. 14, an exploded elevated rear perspective view is shown of an end and side panel assembly of the cargo bed extender shown in FIG. 10 in accordance with one embodiment. Shown is the first side panel 100, the second side panel 102, the end panel 104, the support bar 106, the curved portion of the support bar 108, the first hinge 114, the second hinge 116, the axel 118, a first roller 160, a second roller 162, a first axel pin 164, a second axel pin 166, a first axel bracket 168, a second axel bracket 170 and the retainer clip 120.

When assembled the axel 118 is attached (e.g., via rivets) to a bottom portion of the end panel 104. In addition to the rivets, the first axel bracket 168 and the second axel bracket 170 are attached to the end panel 104 and further secure the axel 118 to the end panel 104. In accordance with one embodiment, the axel 118 does not rotate. The first roller 160 and the second roller 162 are coupled to the axel 118 via the first axel pin 164 and the second axel pin 166, respectively. When fully assembled, the first end block 110 and the second end block 112 prevent the first axel pin 164 and the second axel pin 166 from becoming detached from the axel 118. The first roller 160 and the second roller 162 fit into roller channels (shown in FIGS. 15-17) of the first end block 110 and the second end block 112, respectively. The rollers, in combination with the roller channels, provide one embodiment for stowing and deploying the cargo bed extender from either the housing shown in FIG. 10 or from a tailgate of a truck. When the cargo bed extender is stowed and deployed from the tailgate of the truck, the roller channels are built into the inside of the tailgate.

The first axel pin 164 and the second axel pin 166 allow the first roller 160 and second roller 162 to move in a direction along the axis of the axel 118 when traveling up and down the roller channels. This allows for a smooth movement of the cargo bed extender when stowing or deploying the cargo bed extender.

Figure 15:
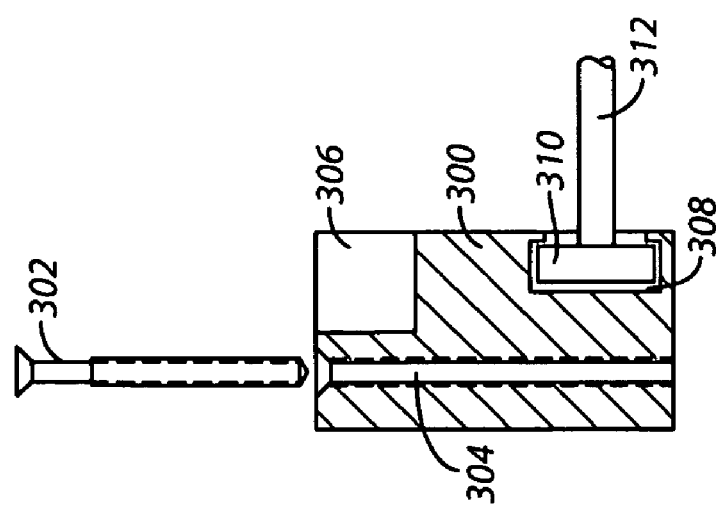
FIG. 15 is an end cross sectional view illustrating an end block of the cargo bed extender shown in FIG. 10 in accordance with one embodiment.

Referring to FIG. 15, an end cross sectional view is shown of an end block of the cargo bed extender shown in FIG. 10 in accordance with one embodiment. Shown is an end block 300, an end block fastener 302, an end block fastener hole 304, an end block notch 306, a roller channel 308, a roller 310, and an axel 312.

The end block fastener 302 (e.g., a screw) fits through the end block fastener hole 304 and into, for example, a tailgate of a truck (not shown). The roller 310 is attached to the axel 312 and fits into the roller channel 308 of the end block 300.

Figure 16:
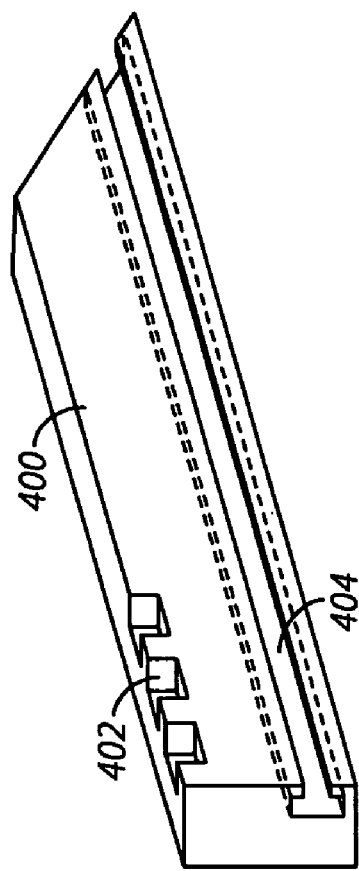
FIG. 16 is a partial perspective view illustrating an end block in accordance with one embodiment.

Referring to FIG. 16, a partial perspective view is shown of an end block in accordance with one embodiment. Shown is the end block 400, a plurality of end block notches 402, and a roller channel 404.

As shown, the roller channel 404 extends the entire length of the end block 404. In one embodiment, an end block strap (not shown) is place along a top side of the end block and down a front side of the end block. The end block strap encloses and end of the roller channel and prevents the rollers from coming out of the roller channel during operation. Alternatively, the end block 400 is formed such that the roller is prevented from coming out of the roller channel 402 during operation.

Figure 17:
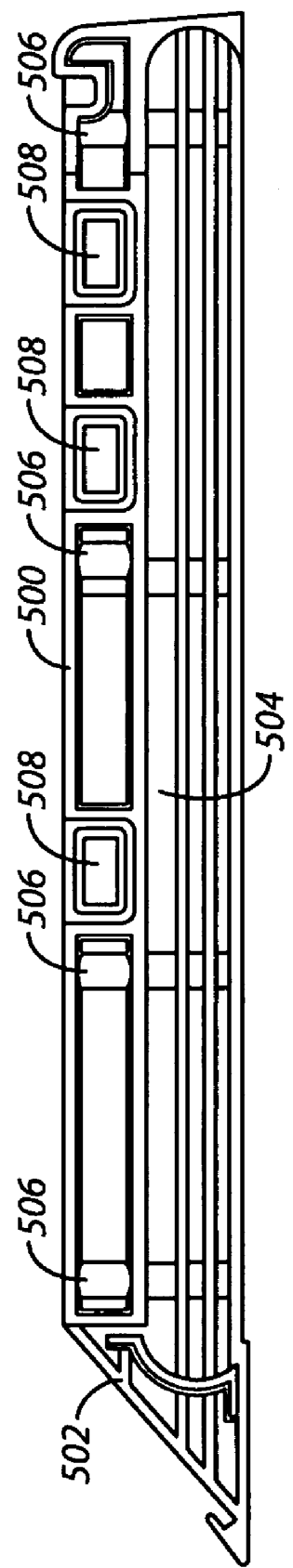
FIG. 17 is a side cross sectional view illustrating an end block and a front block in accordance with one embodiment.

Referring to FIG. 17, a side cross sectional view is shown of an end block and a front block in accordance with one embodiment. Shown is the end block 500, the front block 502, a roller channel 504, a plurality of fastener holes 506, and a plurality of end block notches 508.

The front block 502 is coupled to the end block 500. The roller channel 504 extends the length of the end block 500. The plurality of fastener holes 506 extend through the end block 500. The plurality of end block notches 508 provide support for a support frame (shown in FIG. 12).

Figure 18:
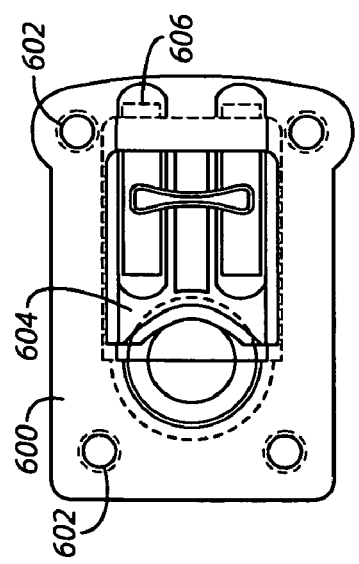
FIG. 18 is a side cross sectional view illustrating a retainer clip assembly in accordance with one embodiment.
Figure 19:
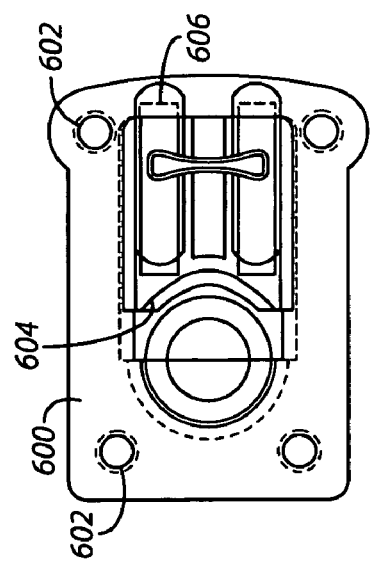
FIG. 19 illustrates the retainer clip assembly of FIG. 18 in an open position in accordance with one embodiment.

Referring to FIG. 18, a side cross sectional view is shown of a retainer clip assembly in accordance with one embodiment. Referring to FIG. 19, the retainer clip assembly of FIG. 18 is shown in an open position in accordance with one embodiment. Shown is a base 600, a plurality of attachment holes 602, a retainer clip 604, a spring assembly 606, and a retainer post 608.

Figure 20:
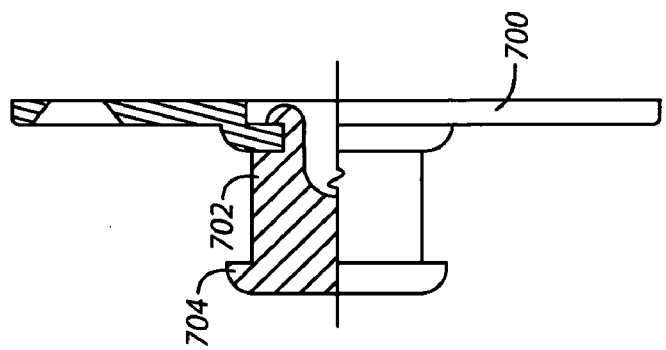
FIG. 20 is a side cross sectional view illustrating a retainer post in accordance with one embodiment.

The retainer clip assembly is attached to a side panel of the cargo bed extender in accordance with one embodiment. The retainer clip assembly, in combination with the retainer post 608 shown in FIG. 20, provides one mechanism for fastening the side panels of the cargo bed extender to the truck. The base 600 of the retainer clip 604 includes the plurality of attachment holes 602. The plurality of attachment hole 602 are used to attach the base 600 of the retainer clip assembly to the side panel of the cargo bed extender.

The base 600 is coupled to the retainer clip 604. The spring assembly 606, forces the retainer clip in a direction toward the retainer post 608.

In operation, the retainer clip 604 is moved to the open position (shown in FIG. 18). The side panel and the base 600 of the retainer clip assembly are then placed over the retainer post 608. The retainer clip 604 is then released. The spring assembly 606 moves the retainer clip 604 toward the retainer post 608 and secures the retainer clip assembly and the side panel of the cargo bed to the retainer post. The spring assembly 608 prevents the side panel from becoming detached during the normal bumps and vibrations that occur during driving.

Referring to FIG. 20, a side cross sectional view is shown of a retainer post in accordance with one embodiment. Shown is a base 700, a post portion 702 and a head portion 704.

The base 700 is fixed to the truck, for example, an inside of a truck bed, a striker post, or other place on the truck in a position aligned with the retainer clip attached to the side panel of the cargo bed extender. As shown in FIGS. 18-19, the retainer clip clasps onto the post portion 702 of the retainer post and the head portion 704 prevents the retainer clip from slipping off of the post portion 702. The head portion 704 of the retainer post prevents the retainer clip assembly from becoming detached during the normal bumps and vibrations that occur during driving.

Figure 21:
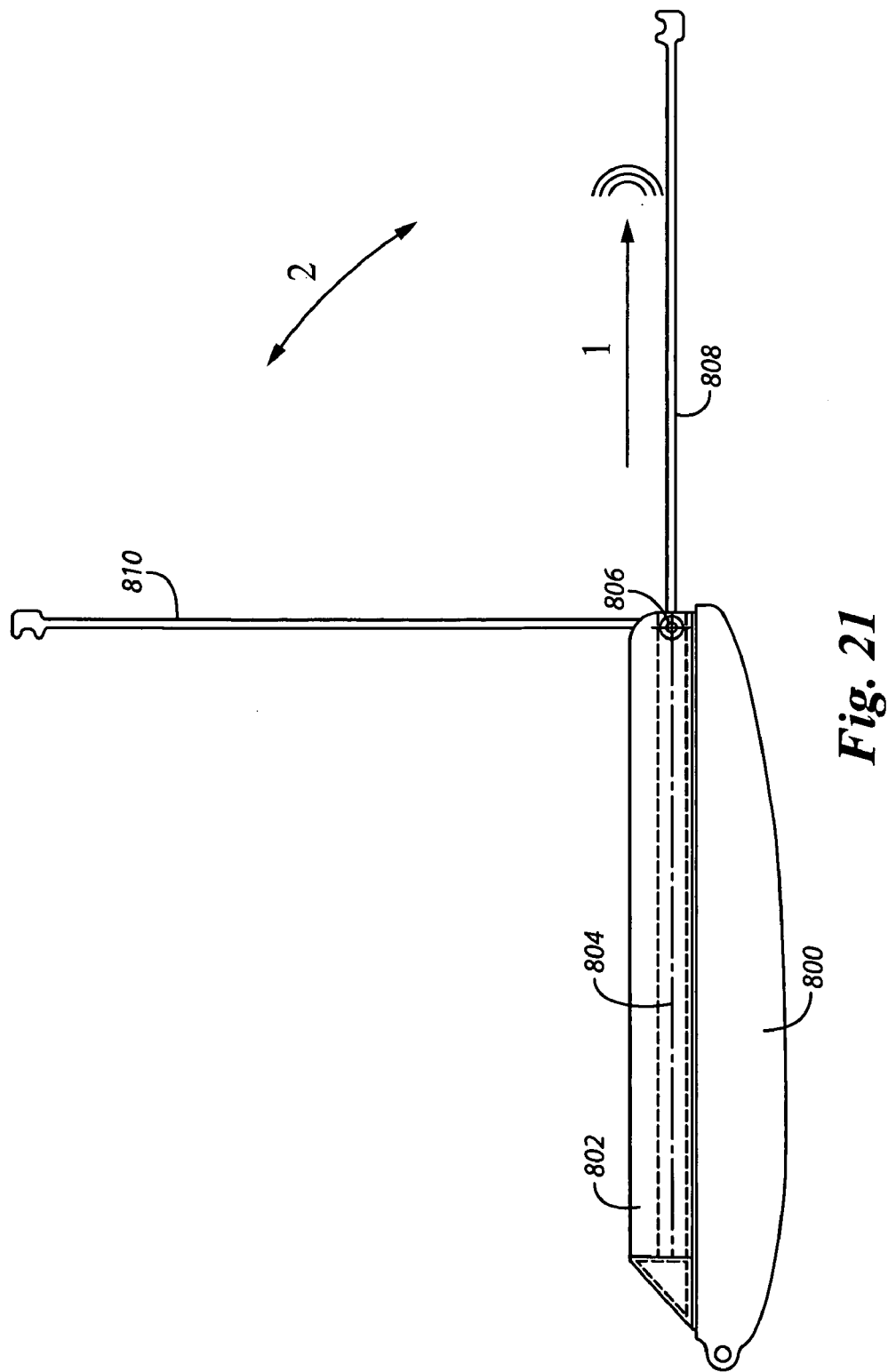
FIG. 21 is a side cross sectional view illustrating the cargo bed extender in accordance with one embodiment.

Referring to FIG. 21, a side cross sectional view is shown of the cargo bed extender in accordance with one embodiment. Shown is a tailgate 800, a housing 802, a roller channel 804, a roller 806, a end panel in a first position 808 and the end panel in a second position 810.

The housing 802 is attached to the tailgate 800. The roller 806 is within the roller channel 808. In operation, the end panel is moved from a stowed position within the housing, to the first position 808. When in the first position, a hinge is formed between the roller 806 and the housing 802 (e.g., between the roller 806 and the end of the roller channel 804). Next, the end panel is rotated about the hinge from the first position 804 to the second position 810. While not shown, the first side panel and the second side panel are also deployed to form extended sides of a truck bed.

In an alternative embodiment, the tailgate provides a housing for the end panel. In operation, the end panel is moved from a stowed position in the tailgate to the first position of the end panel extending out from the tailgate. The end panel is then rotated to the second position. FIGS. 22-25 show one embodiment of the tailgate providing the housing for the end panel.

Figure 22:
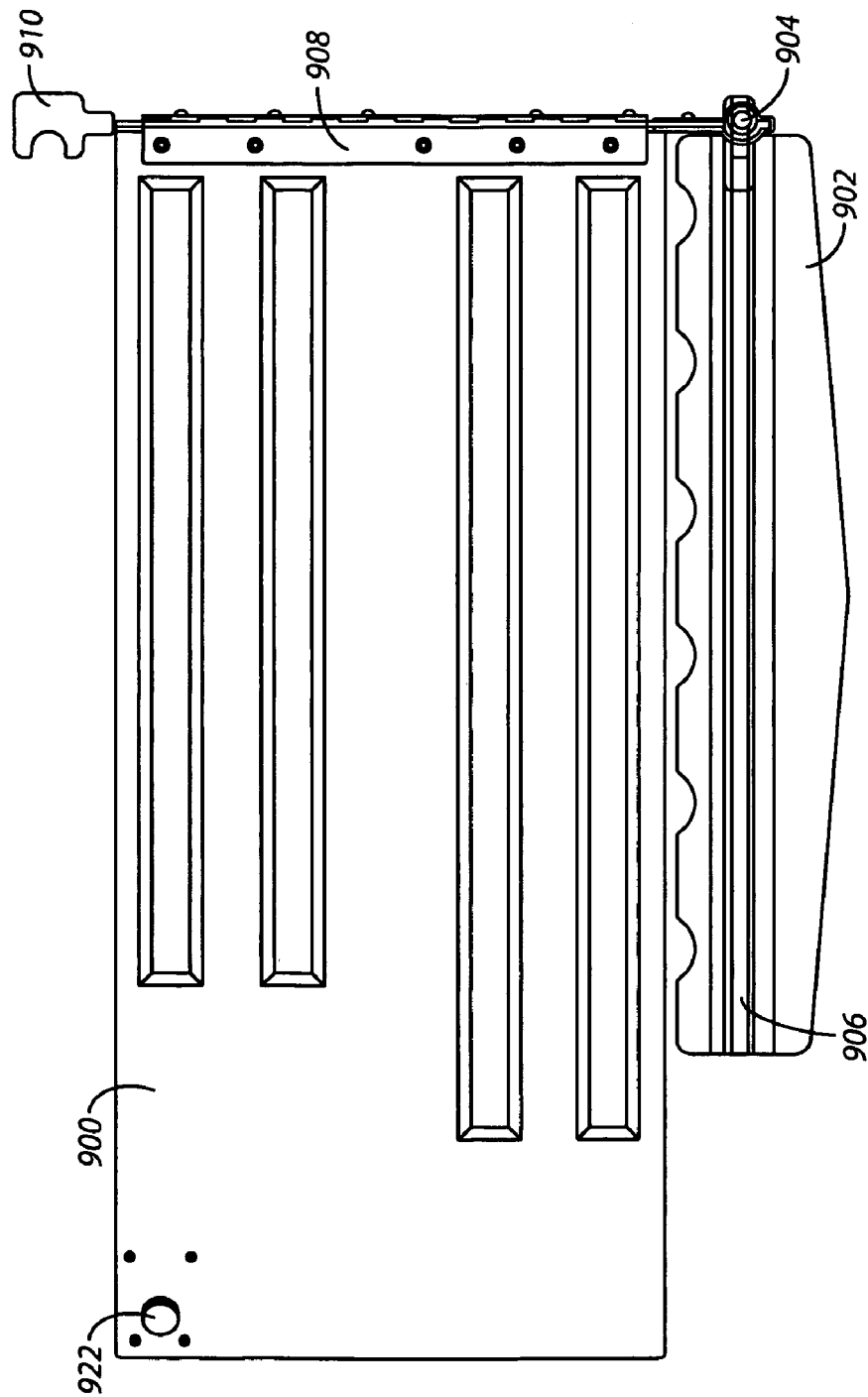
FIG. 22 is a side cross sectional view illustrating a deployed cargo bed extender built into a tailgate in accordance with one embodiment.

Referring to FIG. 22 a side cross sectional view is shown illustrating a deployed cargo bed extender built into a tailgate in accordance with one embodiment. Shown is a side panel 900, a tailgate 902, a first roller 904, a roller channel 906, a hinge 908, a support bar 910, and a retainer clip 922.

The roller channel 906 is built into the tailgate 902. The tailgate provides a housing for the cargo bed extender when the cargo bed extender is in a stowed position (shown in FIG. 23). The first roller 904 slides in the roller channel when the cargo bed extender is being moved into or out of the stowed position. The retainer clip fastens to a retainer mounted inside of the cargo bed of a truck. In some embodiments, the cargo bed extender shown in FIG. 22 has many of the same features as the cargo bed extenders described above.

Figure 23:
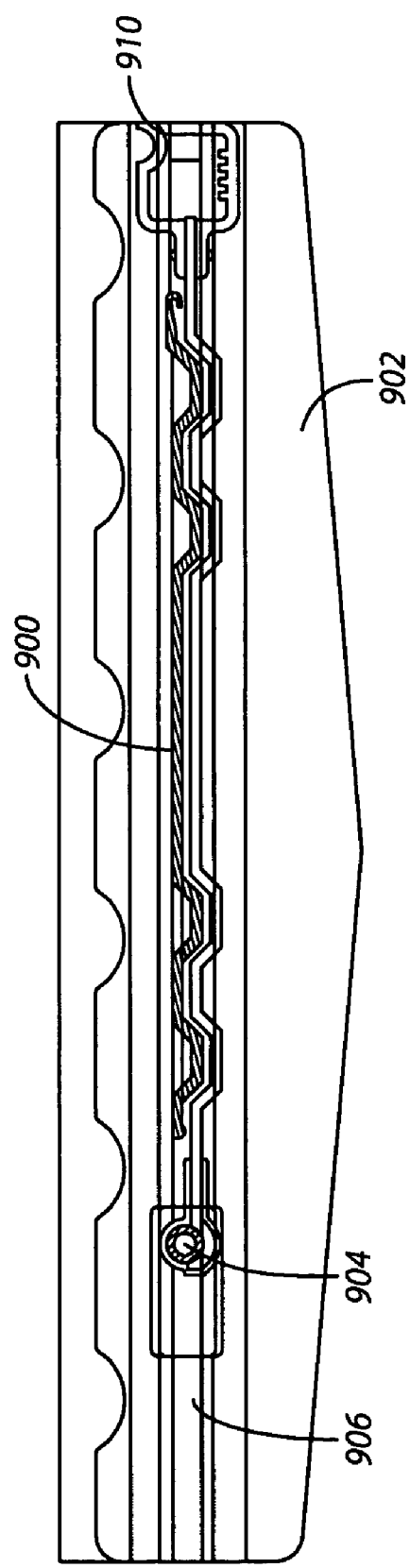
FIG. 23 is a side cross sectional view illustrating the cargo bed extender of FIG. 22 in a stowed position.

Referring to FIG. 23 a side cross sectional view is shown illustrating the cargo bed extender of FIG. 22 in a stowed position. Shown is the side panel 900, the tailgate 902, the first roller 904, the roller channel 906, the support bar 910, and an end panel 920.

As shown, the side panel 900 folds down across a second side panel (not shown) and the end panel 920 when in the stowed position. The entire cargo bed extender conveniently fits into the tailgate 902 when in a stowed position and does not take up any extra space as compared to a standard tailgate.

Figure 24:
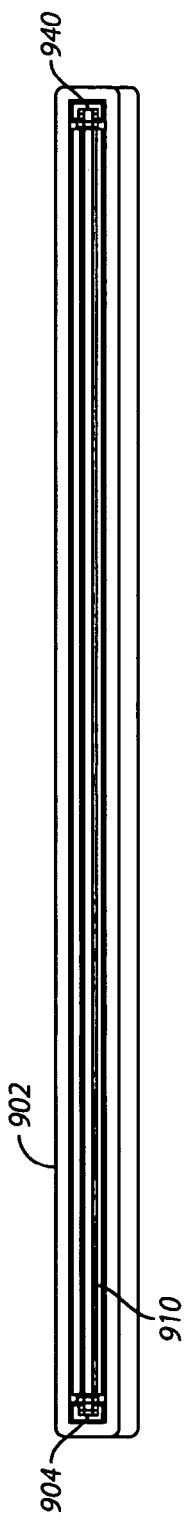
FIG. 24 is a front end cross sectional view of the cargo bed extender of FIG. 22 in a stowed position.

Referring to FIG. 24 a front end cross sectional view is shown of the cargo bed extender of FIG. 22 in a stowed position. Shown is the tailgate 902, the first roller 904, a second roller 940, and the support bar 910. The first roller 904 and the second roller 940 allow the cargo bed extender to easily move in and out of the tailgate 902.

Figure 25:
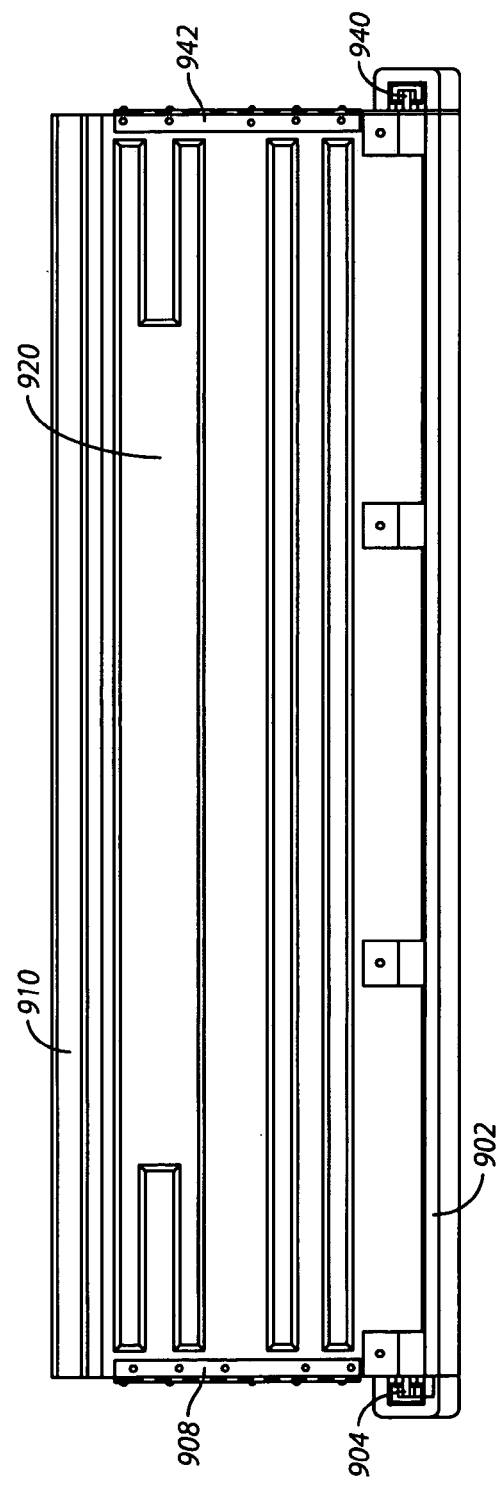
FIG. 25 is a front end cross sectional view of the cargo bed extender of FIG. 22 in a deployed position.

Referring to FIG. 25 a front end cross sectional view is shown of the cargo bed extender of FIG. 22 in a deployed position. Shown is the tailgate 902, the first roller 904, the first hinge 908, the support bar 910, the second roller 940, a second hinge 908 and the end panel 920. When in a deployed position, the end panel 920 provides a back barrier for the cargo bed, thus extending the cargo bed by the length of the tailgate 902.

While the invention herein disclosed has been described by means of specific embodiments and applications thereof, numerous modifications and variations could be made thereto by those skilled in the art without departing from the scope of the invention set forth in the claims.

What is claimed is:

1. A cargo bed extender comprising:
    a housing;
    a first roller channel formed within the housing;
    a second roller channel formed within the housing;
    a first roller positioned within the first roller channel;
    a second roller positioned within the second roller channel;
    an end panel coupled to the first roller and the second roller;
    a first side panel hingedly coupled to the end panel;
    a second side panel hingedly coupled to the end panel;
    a first retainer clip coupled to the first side panel;
    a second retainer clip coupled to the second side panel; and
    wherein the first retainer clip and the second retainer clip are coupled to a first spring and a second spring respectively.

2. The cargo bed extender of claim 1 further comprising a first retainer bar and a second retainer bar positioned to be coupled to the first retainer clip and the second retainer clip, respectively.

3. The cargo bed extender of claim 1 wherein the housing comprises:
    a first end block, wherein the first roller channel is formed within the first end block; and
    a second end block, wherein the second roller channel is formed within the second end block.

4. The cargo bed extender of claim 3 wherein the housing further comprises a front block coupled between the first end block and the second end block.

5. The cargo bed extender of claim 4 wherein the housing comprises a housing panel coupled to the first end block and the second end block, wherein the housing panel at least partially covers the first side panel, the second side panel and the third side panel when the first side panel, the second side panel and the third side panel are in a stowed position.

6. The cargo bed extender of claim 5 further comprising a support frame positioned between the housing panel and the first side panel, the second side panel and the third side panel when the first side panel, the second side panel and the third side panel are in a stowed position.

7. The cargo bed extender of claim 1 wherein the housing comprises a tailgate.

8. The cargo bed extender of claim 7 wherein the housing comprises a tailgate.

* * * * *